US010250139B2

(12) United States Patent
Wan et al.

(10) Patent No.: US 10,250,139 B2
(45) Date of Patent: Apr. 2, 2019

(54) APPARATUSES AND METHODS FOR A LOAD CURRENT CONTROL CIRCUIT FOR A SOURCE FOLLOWER VOLTAGE REGULATOR

(71) Applicant: Micron Technology, Inc., Boise, ID (US)

(72) Inventors: Yuanzhong Wan, Boise, ID (US); Dong Pan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/087,271

(22) Filed: Mar. 31, 2016

(65) Prior Publication Data

US 2017/0288542 A1  Oct. 5, 2017

(51) Int. Cl.
*G05F 1/56* (2006.01)
*H02M 3/158* (2006.01)
*H02M 1/08* (2006.01)
*G05F 1/565* (2006.01)

(52) U.S. Cl.
CPC ............. *H02M 3/158* (2013.01); *G05F 1/56* (2013.01); *G05F 1/565* (2013.01); *H02M 1/08* (2013.01)

(58) Field of Classification Search
CPC .... H02M 2001/009; H02M 2001/0045; G05F 1/575; G05F 1/56; G05F 1/573; G05F 3/30; G05F 3/262
USPC ................. 323/267, 268, 273–281, 314–317
See application file for complete search history.

(56) References Cited

U.S. PATENT DOCUMENTS

| | | | |
|---|---|---|---|
| 5,218,364 A * | 6/1993 | Kumazawa | H03M 1/0604 341/136 |
| 5,512,814 A | 4/1996 | Allman | |
| 6,188,211 B1 | 2/2001 | Rincon-Mora et al. | |
| 6,377,109 B1 | 4/2002 | Yama | |
| 6,956,413 B2 * | 10/2005 | Bailey | H03K 4/026 327/131 |
| 7,136,003 B1 * | 11/2006 | Ripley | H03G 3/3047 341/144 |
| 7,414,459 B2 * | 8/2008 | Pisasale | G11C 5/147 307/109 |
| 8,080,984 B1 | 12/2011 | Geynet | |
| 2006/0103453 A1 * | 5/2006 | Pisasale | G05F 3/262 327/541 |
| 2013/0027007 A1 | 1/2013 | Zhong et al. | |

(Continued)

OTHER PUBLICATIONS

First Office Action dated Oct. 5, 2017 for Taiwanese application No. 106111258.

(Continued)

*Primary Examiner* — Nguyen Tran
(74) *Attorney, Agent, or Firm* — Dorsey & Whitney LLP

(57) ABSTRACT

According to one embodiment of this disclosure, an apparatus is disclosed. The apparatus includes a voltage regulator configured to produce a regulated voltage, a plurality of current circuits coupled in parallel between an output node and a power node, each of the plurality of current circuits including first and second transistors coupled in series, the first transistor of each of the plurality of current circuits being biased with the regulated voltage, and a control circuit configured to activate the second transistor of selected one or ones of the plurality of current circuits responsive, at least in part, to a voltage at the output node.

20 Claims, 5 Drawing Sheets

(56) References Cited

U.S. PATENT DOCUMENTS

2014/0062442 A1 3/2014 Seymour et al.
2014/0312865 A1 10/2014 Dobkin et al.

OTHER PUBLICATIONS

International Search Report and Written Opinion dated Jun. 8, 2017 for PCT application No. PCT/US2017/022245.

* cited by examiner

US 10,250,139 B2

APPARATUSES AND METHODS FOR A LOAD CURRENT CONTROL CIRCUIT FOR A SOURCE FOLLOWER VOLTAGE REGULATOR

BACKGROUND

Many memory devices, such as Dynamic Random Access Memory (DRAM) use source follower circuits in a variety of contexts such as voltage buffers, reference voltage generators, and voltage regulators. In source follower voltage regulators, an amplifier receives a reference voltage and provides a regulated voltage to a gate of a transistor. The output voltage, taken at the source of the transistor is provided back to the amplifier as a feedback loop. In some traditional memory devices, current loads may vary, and an increased current load may negatively impact the voltage independence of the source follower.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Embodiments described herein recognize that source follower amplifiers have a variety of uses including as reference voltage generators. However, traditional reference voltage generators using source follower amplifiers suffer from certain drawbacks. For example, traditional reference voltage generators are current dependent. That is, the output voltage of the reference voltage generator may decrease as the current load increases. The current dependency may be reduced by adding additional current circuits in parallel with the source follower circuit used to generate the output voltage. However, the additional current circuits drain substantial power. Further, all of the additional current circuits may not be necessary to handle the current load at all times. Therefore, embodiments described herein disclose, among other things, a source follower voltage regulator with a load current control circuit configured to selectively activate and/or deactivate one or more additional current circuits based, at least in part, on an output voltage of the current circuits.

Figure 1:
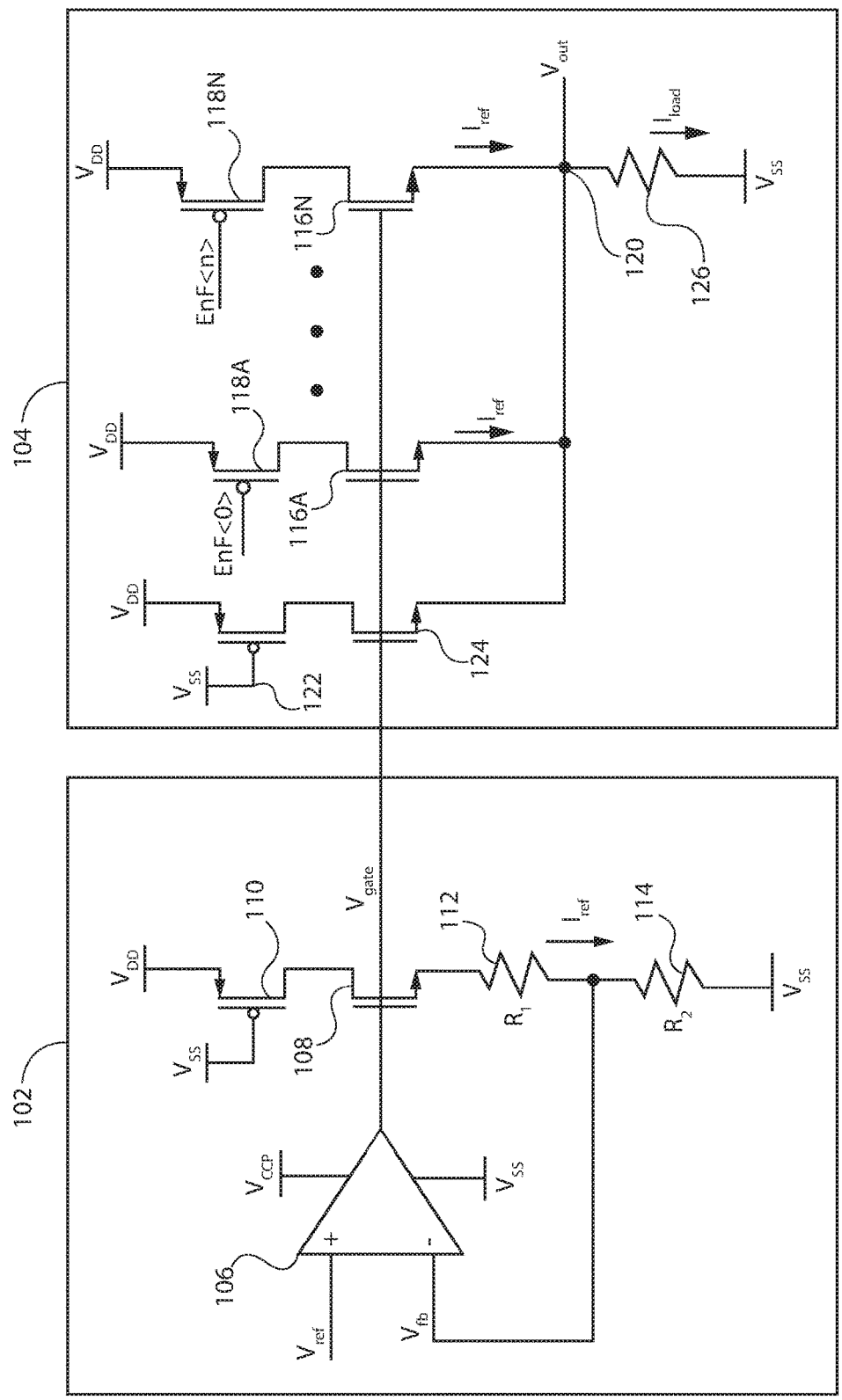
FIG. 1 is a schematic diagram of a voltage regulator circuit with load current control circuit, in accordance with an embodiment of the present invention.

FIG. 1 is a schematic diagram of a voltage regulator circuit 102 with load current control circuit 104 to provide current to a load 126 have a load current demand $I_{load}$, in accordance with an embodiment of the present invention. The voltage regulator circuit 102 generally includes a source follower reference voltage generator. The voltage regulator circuit 102 includes an amplifier 106, a first transistor 108, a second transistor 110, a first resistor 112, and a second resistor 114. In various embodiments, the amplifier 106 may be a differential amplifier. In other embodiments, other amplifiers may also be used. The first transistor 108 may be, for example, a field effect transistor (FET), such as an N channel metal oxide semiconductor (NMOS) transistor. The second transistor 110 may be, for example, a FET, such as a P channel metal oxide semiconductor (PMOS) transistor. Other types of transistors may also be used. The first resistor 112 may have a first resistance, $R_1$, and the second resistor 114 may have a second resistance, $R_2$. Although generally referred to herein as "resistors" the resistors 112 and 114 may generally be any circuit element capable of providing a resistance.

The amplifier 106 may be configured to receive a reference voltage, $V_{ref}$, at a non-inverting input terminal. The amplifier 106 may be further configured to receive a feedback voltage, $V_{fb}$, at an inverting input terminal. The amplifier 106 may provide a regulated voltage, $V_{gate}$, based on the relative voltages of the reference voltage and the feedback voltage. For example, the amplifier 106 may amplify the difference in the voltage potential between its inverting and non-inverting input terminals (i.e., $V_{fb}$ and $V_{ref}$ respectively). In various embodiments, the amplifier 106 may be regulated by the feedback voltage $V_{fb}$ to provide a constant voltage $V_{gate}$.

In various embodiments, the source of the second transistor 110 may be coupled to a first supply voltage, $V_{DD}$. The gate of the second transistor 110 may be coupled to a second supply voltage, $V_{SS}$. The second supply voltage $V_{SS}$ may be less than the first supply voltage $V_{DD}$. The drain of the second transistor 110 may be coupled to the drain of the first transistor 108. The gate of the first transistor 108 may be coupled to the regulated voltage, $V_{gate}$. The source of the first transistor 108 may be coupled in series to the first resistor 112 and the second resistor 114, which may be coupled to the second supply voltage $V_{SS}$. The inverting input terminal of the amplifier 106 may be coupled between the first resistor 112 and the second resistor 114 and the first resistor 112 and the second resistor 114 may provide a feedback voltage, $V_{fb}$, to the inverting input terminal of the amplifier 106. The first resistor 112 may carry a reference current, $I_{ref}$, which may depend on the relative values of the first supply voltage, $V_{DD}$, and the resistances $R_1$ and $R_2$.

To compensate for the high load current demands of the load 126, a load current control circuit 104 may selectively activate one or more additional current circuits to provide additional current to the load 126 while maintaining a constant output voltage $V_{out}$. In some embodiments, one current circuit may be continuously activated to provide a standby current circuit for handling the load 126. That is, one of the additional current circuits may be activated at all times to provide current to the load 126. In the embodiment of FIG. 1, a standby current circuit comprising transistors 122 and 124 is shown. The source of the transistor 122 may be coupled to the first supply voltage $V_{DD}$. The gate of the transistor 122 may be coupled to the second supply voltage $V_{SS}$ to ensure that the standby current circuit remains active. The drain of the transistor 122 may be coupled to the drain of the transistor 124. The gate of the transistor 124 may be coupled to the regulated voltage $V_{gate}$. The source of the transistor 124 may be coupled to the load 126 at the node 120.

A number of activated additional current circuits may supplement the standby current circuit to compensate for a load 126 with high load current demand that the standby current circuit may be unable to handle on its own. Each additional current circuit may include a first transistor (e.g., first transistors 116A-N, generally referred to as first transistor 116) and a second transistor (e.g., second transistors 118A-N, generally referred to as second transistor 118). For each additional current circuit, the source of the second transistor 118 may be coupled to a first supply voltage, $V_{DD}$. The gate of each of the second transistors may be coupled to one or more enable signals (e.g., EnF<0:N>), that may selectively activate and deactivate the additional current circuits. Example circuits for providing the enable signals are discussed in further detail below with respect to FIGS. 2 and 3. The drain of the second transistor 118 may be coupled to the drain of the first transistor 116. The gate of the first transistor 116 may be coupled to the regulated voltage, $V_{gate}$.

The source of the first transistor 116 of each additional current circuit may be coupled to an output node 120, which may provide an output voltage, $V_{out}$. The output node 120 may be further coupled to the load 126, which is coupled to the second supply voltage, $V_{SS}$. Each additional current circuit may carry a current between the source of the first transistor 116 and the output node 120 that is equal to the reference current, $I_{ref}$. The sum of all of the reference currents, that is, to the load 126 between the output node 120 and the second supply voltage, $V_{SS}$, may be substantially equal to the load current demand, $I_{load}$. Generally, if the number of active additional current circuits provides sufficient current to meet the load current demand, then the output voltage, $V_{out}$, may substantially match the reference voltage, $V_{ref}$. If an insufficient number of additional current circuits are activated to provide adequate current to meet the load current demand, then the output voltage, $V_{out}$, may begin to decrease. Additional current circuits may be activated to provide additional current to meet the load current demand of the load 126. Example circuits for activating one or more additional current circuits are described below with respect to FIGS. 2 and 3.

In various embodiments, the number of additional current circuits activated by each successive enable signal may increase. For example, the enable signal EnF<0> may activate a single additional current circuit (for a total of two: the standby current circuit and the one additional current circuit), the enable signal EnF<1> may activate 2 additional current circuits in addition to the two already activated, the enable signal EnF<2> may activate 4 additional current circuits in addition to the four already activated, etc. The progression of activating additional current circuits is described in further detail below with respect to FIG. 4.

Figure 2:
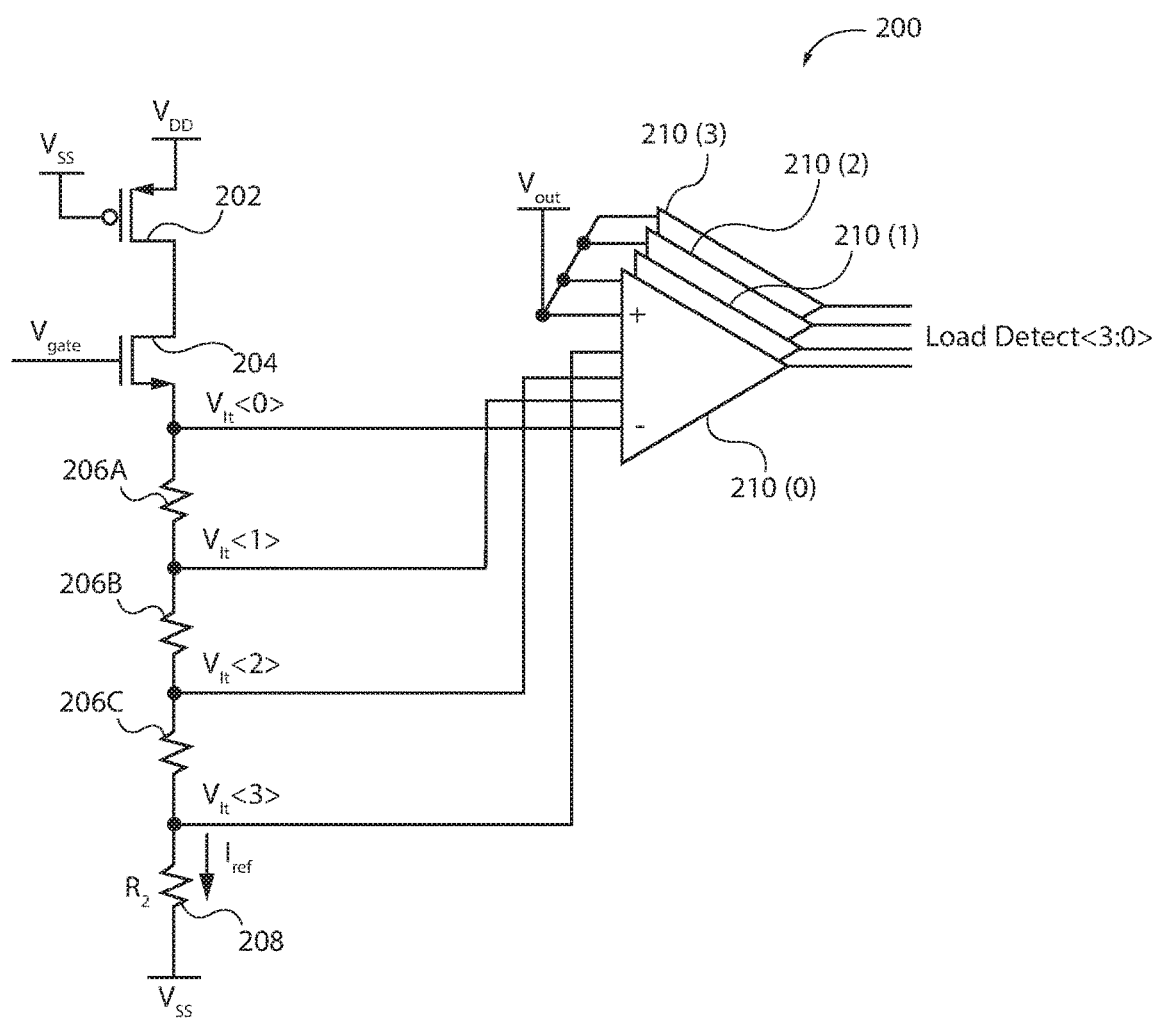
FIG. 2 is a schematic diagram of a load detection circuit, in accordance with an embodiment of the present invention.

FIG. 2 is a schematic diagram of a load detection circuit, generally designated 200, in accordance with an embodiment of the present invention. Generally, the load detection circuit 200 is configured to detect a load current demand and provide a signal indicative of the load current demand. The load detection circuit 200 includes a first transistor 202, a second transistor 204, load resistors 206A-C, a second resistor 208, and a plurality of comparators 210(0)-210(3). Although four comparators 210(0)-210(3) are shown in FIG. 2 to create four load detect signals (collectively referred to as load detect <3:0>), those skilled in the art will appreciate that a greater or fewer number of comparators may be used to create a respective greater or fewer number of load detect signals. The first transistor 202, the second transistor 204, and the second resistor 208 may be implemented in the same manner as the first transistor 110, the second transistor 108, and the second resistor 114, respectively.

The load resistors 206A-C may be implemented to provide load threshold voltages for activating additional current circuits (see FIG. 1) when compared with the output voltage, $V_{out}$. Each of the load resistors 206A-C may have an associated resistance. In various embodiments, the resistance associated with the load resistor 206A may be less than the resistance associated with the load resistor 206B, which may be less than the resistance associated with the load resistor 206C. The load resistors 206A-C may be selected to provide threshold voltages at which additional current circuits may be switched on. As such, the load resistors 206A-C may be considered to correspond to different load currents which create a threshold for activating additional current circuits. The plurality of comparators 210(0)-210(3) may each receive two input voltages and provide respective output signal that is indicative of which of the inputs is larger. The comparators 210(0)-210(3) may be, for example, operational amplifiers.

The source of the first transistor 202 may be coupled to the first power supply, $V_{DD}$. The gate of the first transistor 202 may be coupled to the second power supply, $V_{SS}$. The drain of the first transistor 202 may be coupled to the drain of the second transistor 204. The gate of the second transistor 204 may be coupled to the regulated voltage, $V_{gate}$, which in some embodiments may be provided by the amplifier 106 of FIG. 1, for example. The source of the second transistor 204 may be coupled in series to the load resistors 206A-C and the second resistor 208, which may be coupled to the negative power source $V_{SS}$. When a current flows through the load resistors 206A-C, a voltage drop may be created across each of the load resistors 206A-C. Additionally, an initial load threshold voltage may be created at the source of the second transistor 204. Load threshold voltages may be created at the source of the second transistor 204 and after each load resistor 206A-C. The initial load threshold voltage and the load threshold voltage across each of the load resistors 206A-C may be collective referred to as a reference signal, $V_{It}<3:0>$. For example, in the embodiment of FIG. 2, $V_{It}<0>$ may be indicative of the initial load threshold voltage, $V_{It}<1>$ may be indicative of the first load threshold voltage, etc.

Each load threshold voltage may correspond to a drop in voltage in the output voltage $V_{out}$ resulting from an increased load current demand. The initial load threshold voltage, $V_{It}<0>$, may be substantially equal to the source voltage of the second transistor 204. The second load threshold voltage, $V_{It}<1>$, may be substantially equal to the source voltage of the second transistor 204 minus the voltage drop across the load resistor 206A and may be indicative of a drop in the output voltage, $V_{out}$, resulting from a load current of between 20 µA and 40 µA. The third load threshold voltage, $V_{It}<2>$, may be substantially equal to the source voltage of the second transistor 204 minus the voltage drop across the load resistors 206A and 206B and may be indicative of a drop in the output voltage, $V_{out}$, resulting from a load current of between 40 µA and 60 µA. The fourth load threshold voltage, $V_{It}<3>$, may be substantially equal to the source voltage of the second transistor 204 minus the voltage drop across the load resistors 206A-C and may be indicative of a drop in the output voltage, $V_{out}$, resulting from a load current of between 60 μA and 80 μA. Other load threshold voltages corresponding to different current ranges may also be used without deviating from the scope of this disclosure.

Each of the comparators 210(0)-210(3) may be configured to receive the output voltage, $V_{out}$, at a non-inverting input terminal and to receive a component signal of the reference signal, $V_{lt}$<3:0> at an inverting input terminal. For example, one of the comparators 210(0) may be configured to receive the initial load threshold voltage, $V_{lt}$<0>, and each of the remaining comparators 210(1)-210(3) may be configured to receive one of the load threshold voltages, $V_{lt}$<1>, $V_{lt}$<2>, and $V_{lt}$<3> created across the load resistors 206A-C. The comparators 210(0)-210(3) may each produce an output signal indicative of whether the received load threshold voltage (e.g., $V_{lt}$<0>, $V_{lt}$<1>, $V_{lt}$<2>, or $V_{lt}$<3>) is greater than or less than the output voltage, $V_{out}$. The output signals of the comparators 210(0)-210(3) may collectively provide a load detect signal <3:0>. For example, the comparator 210(0) may create the load detect signal <0>, the comparator 210(1) may create the load detect signal <1>, the comparator 210(2) may create the load detect signal <2>, and the comparator 210(3) may create the load detect signal <3>. The value of each bit of the load detect signal <3:0> is indicative of whether the output voltage, $V_{out}$, is greater than or less than a respective load threshold voltage created across one of the load resistors 206A-C or the initial load threshold voltage.

In operation, the regulated voltage, $V_{gate}$, activates the second transistor 204 allowing current to flow through the load resistors 206A-C. Because the current flowing through the resistors is constant, the voltage created across each load resistor 206A-C is also constant, creating steady load threshold voltages. As discussed above, each load threshold voltages may correspond to a drop in the output voltage, $V_{out}$, resulting from an increased load current demand. Each of the load threshold voltages is provided to an inverting input terminal of a respective comparator 210. The respective comparator 210 compares the received respective load threshold voltage to the output voltage, $V_{out}$, which is coupled to a non-inverting input terminal. Each of the comparators 210 provides a respective load detect signal indicative of whether the output voltage, $V_{out}$, is greater than or less than the received respective load threshold voltage. That is, a comparator 210 provides a respective signal indicative of whether an increased load current has caused the output voltage, $V_{out}$, to drop below the respective load threshold voltages, which may indicate the need to activate additional current circuits. The individual load detect signals are collectively referred to as the load detect signal <3:0>.

Figure 3:
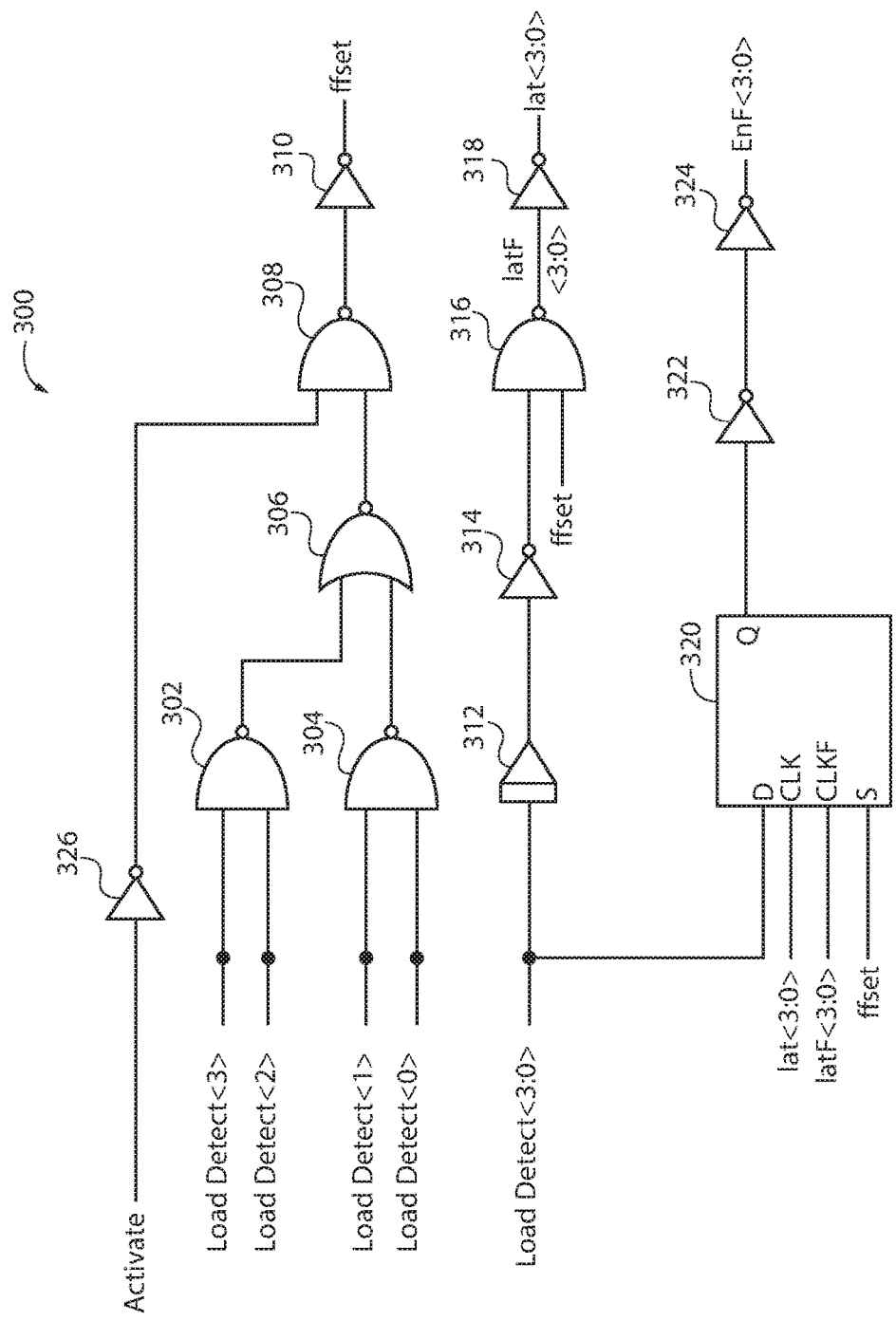
FIG. 3 is a schematic of a control circuit, in accordance with an embodiment of the present invention.

FIG. 3 is a schematic of a control circuit, generally designated 300, in accordance with an embodiment of the present invention. In general, the control circuit generates one or more enable signals EnF<3:0> based on the load detect signals <3:0>. The control circuit 300 includes NAND gates 302, 304, 308, and 316, NOR gate 306, buffer 312, inverters 310, 314, 318, 322, 324, and 326, and a flip flop 320.

In general, the combination of the NAND gates 302 and 304, the NOR gate 306, the NAND gate 308, and the inverter 310 may provide a flip flop set signal ffset that may be used to trigger a reset in the flip flop 320 when additional current circuits may be needed to meet an increased current load demand. The NAND gate 302 may be configured to receive two of the load detect signals (e.g., load detect <3> and load detect <2>) and to provide a signal to an input of the NOR gate 306. Similarly, the NAND gate 304 may be configured to receive two of the load detect signals (e.g., load detect <1> and load detect <0>) and to provide an output signal to the NOR gate 306. Because the load detect signals <3:0> activate sequentially based on the resistances associated with the load resistors 206A-C of FIG. 2, the outputs of the NAND gates 302 and 304 will likewise change in a predictable sequence. That is, each time a voltage drop in the output voltage, $V_{out}$, exceeds a load threshold voltage associated with a load resistor 206, the output signal of one of the NAND gates 302 or 304 will also change.

Although FIG. 3 is shown having a total of four load detect signals, those skilled in the art will appreciate that the embodiment may be modified to include greater or fewer load detect signals based on the number of additional current circuits desired. The NOR gate 306 provides an output signal to the NAND gate 308. The NAND gate 308 may also receive an activate signal, Activate, that selectively enables the control circuit 300 by ensuring that the flip flop set signal, ffset, can only transition when the enable signal EnF is active. The NAND gate 308 may provide an output signal to the inverter 310. The inverter 310 may provide the flip flop set signal, ffset, which may be coupled to a set input of the flip flop 320, thereby triggering a set function of the flip flop when the load detect signals <3:0> are all inactive.

The combination of the buffer 312, the inverter 314, the NAND gate 316, and the inverter 318 may be configured to provide a latch signal, lat<3:0>, and a complementary latch signal latF<3:0>. The latch signal and the complementary latch signal may be provided to a clock input and an inverted clock input of the flip flop 320, respectively. The load detect signal <3:0> may be provided to the buffer 312, which may be further coupled to the inverter 314. The output of the inverter 314 may be provided to the NAND gate 316. The flip flop set signal, ffset, may also be provided to the NAND gate 316. The output of the NAND gate 316 may change responsive to a change in the load detect signal <3:0> and/or the flip flop set signal, ffset. The NAND gate 316 may provide the complementary latch signal <3:0>, which may be provided to the inverted clock input of the flip flop 320. The complementary latch signal, latF <3:0> may also be provided to the inverter 318, which may provide the latch signal <3:0> to the clock input of the flip flop 320. Because the latch signal <3:0> changes only when one or more of the load detect signals <3:0> changes, the latch signal may ensure that the flip flop 320 changes only when additional current circuits are required (or no additional current circuits are required and the flip flop 320 resets).

The flip flop 320 may receive the load detect signal <3:0> as a data input. Although a single flip flop 320 is shown, those skilled in the art will appreciate that the flip flop 320 may represent one or more flip flops. In one embodiment, there is a flip flop for each component signal of the load detect signal <3:0>. For example, a first flip flop may be configured to receive the load detect signal <0> as a data input and the latch signal <0> as a clock input, a second flip flop may be configured to receive the load detect signal <1> as a data input and the latch signal <1> as a clock input, and so on for load detect signals <2> and <3>. In operation, when the flip flop 320 detects a change in the latch signal <3:0>, such as a rising edge of one of the component latch signals (e.g., latch signal lat<2>), then the flip flop provides an active output signal corresponding to the load detect signal <3:0>. In various embodiments, the flip flop 320 may provide the analogous component signal of the load detect signal <3:0> as the changed component signal of the latch signal <3:0>. For example, if the flip flop 320 determines that the latch signal, lat<2>, changes, then the flip flop 320 provides the corresponding load detect signal <2> as an output. The output of the flip flop 320 may be provided to the inverters 322 and 324.

The inverter 324 may provide enable signals EnF<3:0> for activating additional current circuits, as discussed above with respect to FIG. 1. The component signals of the enable signals EnF<3:0> may be provided to a respective one or more of the second transistors 118 of the additional current circuits in FIG. 1 for selectively activating the additional current circuits. As discussed above, each additional enable signal may activate a number of additional current circuits. For example, the enable signal EnF<0> may activate a single additional current circuit (for a total of two: the standby current circuit and the one additional current circuit), the enable signal EnF<1> may activate 3 additional current circuits in addition to the two already activated, the enable signal EnF<2> may activate 7 additional current circuits in addition to the five already activated, etc.

Figure 4:
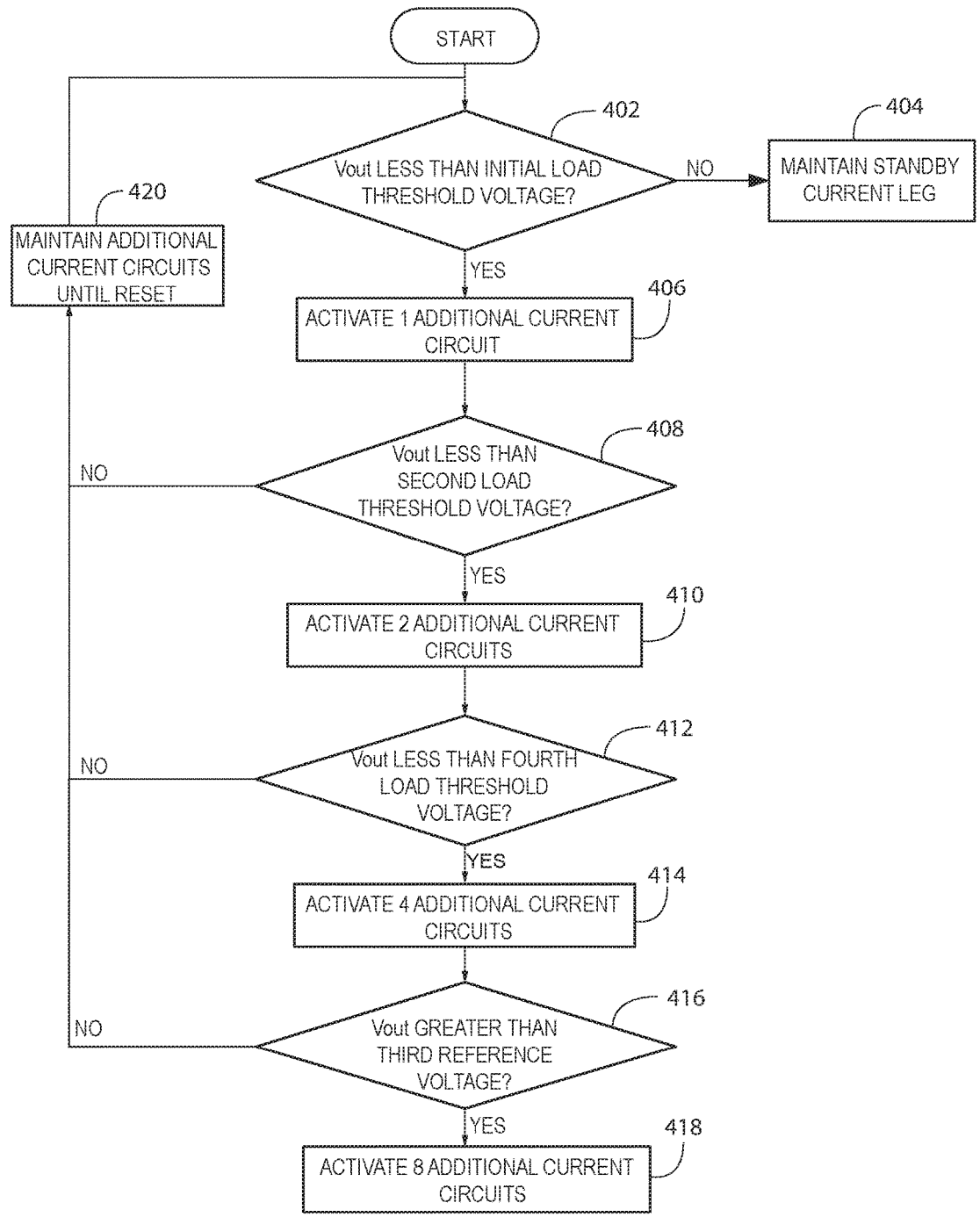
FIG. 4 is a flowchart illustrating a method of activating additional current circuits, in accordance with an embodiment of the present invention.

FIG. 4 is a flowchart illustrating a method of activating additional current circuits, in accordance with an example embodiment of the present invention. In decision block 402, the load detect circuit 200 of FIG. 2 determines whether the output voltage, $V_{out}$, is less than the initial load threshold voltage. As described above, the initial load threshold voltage, $V_{lt}<0>$, may be equal to the source voltage of the second resistor 204. The initial load threshold voltage may be compared to the output voltage, $V_{out}$, by the comparator 210(0) of the load detect circuit 200. If the load detect circuit 200 determines that $V_{out}$ is equal to or greater than the initial load threshold voltage (Decision Block 402, NO branch), then the control circuit 300 maintains the standby current leg and does not activate additional current legs in operation 404.

If the load detect circuit 200 determines that $V_{out}$ is less than the initial load threshold voltage (decision block 402, YES branch), then the control circuit 300 activates one additional current circuit in operation 406. As discussed above with respect to FIGS. 1-3, if the load detect circuit 200 determines that $V_{out}$ is less than the initial load threshold voltage (i.e., that $V_{out}$ has dropped by an amount greater than $V_{ref}$—the initial load threshold voltage), then the comparator 210(0) may provide a load detect signal (e.g., load detect <0>) indicative thereof. The control circuit 300 may receive the load detect signal and provide an enable signal EnF<0> to the first transistor 116A, which activates one additional current circuit.

In decision block 408, the load detect circuit 200 determines whether $V_{out}$ is less than a second load threshold voltage. The determination in decision block 408 may be made in substantially the same manner as the determination in operation 402. However, instead of comparing $V_{out}$ with the initial load threshold voltage, $V_{lt}<0>$, the comparator 210(1) of the load detect circuit 200 compares $V_{out}$ with a second load threshold voltage, such as $V_{lt}<1>$. If the load detect circuit 200 determines that the output voltage $V_{out}$ is not less than the second reference voltage (decision block 408, NO branch), then the control circuit 300 maintains the active current legs until the flip flop 320 is reset. The flip flop 320 may be reset, for example, by detecting that all load detect signals <3:0> are inactive. If the load detect circuit 200 determines that $V_{out}$ is less than the second load threshold voltage (decision block 408, YES branch), then the control circuit 300 activates two additional current circuits in operation 410. For example, the control circuit 300 may provide an active enable signal EnF<1> to the first transistors 116B of two additional current circuits.

In decision block 412, the load detect circuit 300 determines whether $V_{out}$ is less than the third load threshold voltage. The determination in operation 412 may be made in substantially the same manner as in decision blocks 402 and 408, except with the third load threshold voltage (e.g., $V_{lt}<2>$ compared with $V_{OUT}$ by the comparator 210(2)). If the load detect circuit 200 determines that $V_{out}$ is not less than the third load threshold voltage (decision block 412, NO branch), then the control circuit 300 maintains the previously activated current legs in operation 420 until a reset occurs. If the load detect circuit 200 determines that $V_{out}$ is less than the third load threshold voltage (decision block 412, YES branch), then the control circuit 300 activates four additional current circuits in operation 414. For example, the control circuit 300 may provide an active enable signal EnF<2> to the first transistors 116C of four additional current circuits.

In decision block 416, the load detect circuit 200 determines whether $V_{out}$ is less than the fourth load threshold voltage. The determination in operation 416 may be made in substantially the same manner as in decision blocks 402, 408, and 412, except with the fourth load threshold voltage (e.g., $V_{lt}<3>$ compared with $V_{OUT}$ by the comparator 210 (3)). If the load detect circuit 200 determines that $V_{out}$ is not less than the fourth load threshold voltage (decision block 416, NO branch), then the control circuit 300 maintains the previously activated current legs in operation 420 until a reset occurs. If the load detect circuit 200 determines that $V_{out}$ is less than the fourth load threshold voltage (decision block 416, YES branch), then the control circuit 300 activates eight additional current circuits in operation 418. For example, the control circuit 300 may provide an active enable signal EnF<3> to the first transistors 116D of eight additional current circuits. In some embodiments, once the eight additional current circuits are activated in operation 418, the control circuit may maintain the additional current circuits in operation 420 until a reset occurs. In some embodiments, any additional current circuits that are activated may be cumulative with previously activated current circuits. That is, once an additional current circuit is activated, it is not deactivated until a reset occurs.

Figure 5:
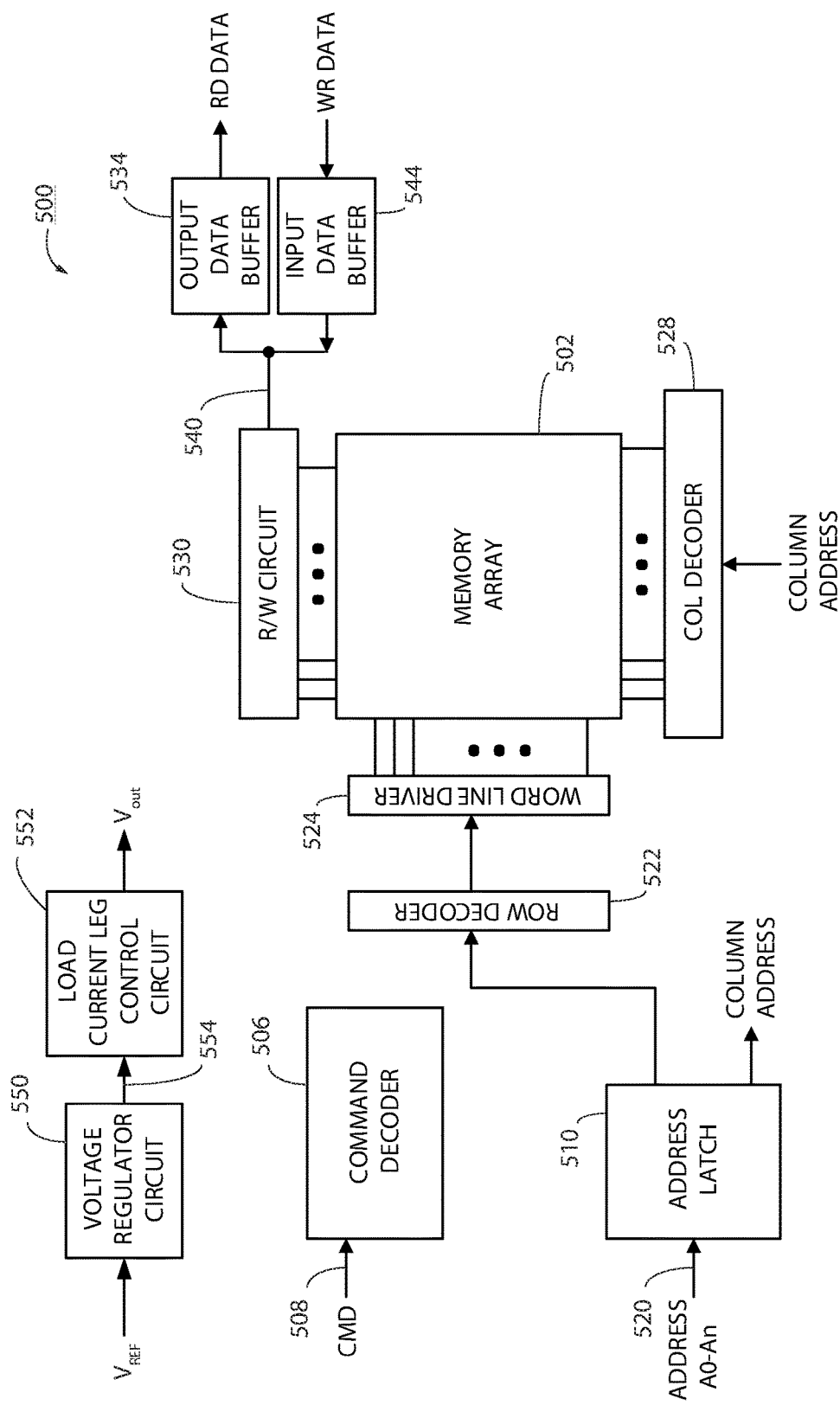
FIG. 5 is a block diagram of a memory depicting an apparatus including a voltage regulator circuit and a load current control circuit, in accordance with an embodiment of the present invention.

FIG. 5 is a block diagram of a memory 500 including a including a source follower voltage regulator with load current control, according to an embodiment of the invention. The memory 500 may include an array 502 of memory cells, which may be, for example, volatile memory cells (e.g., dynamic random-access memory (DRAM) memory cells, static random-access memory (SRAM) memory cells), non-volatile memory cells (e.g., flash memory cells), or some other types of memory cells. The memory 500 includes a command decoder 506 that may receive memory commands through a command bus 508 and provide (e.g., generate) corresponding control signals within the memory 500 to carry out various memory operations. For example, the command decoder 506 may respond to memory commands provided to the command bus 508 to perform various operations on the memory array 502. In particular, the command decoder 506 may be used to provide internal control signals to read data from and write data to the memory array 502. Row and column address signals may be provided (e.g., applied) to an address latch 510 in the memory 500 through an address bus 520. The address latch 510 may then provide (e.g., output) a separate column address and a separate row address.

The address latch 510 may provide row and column addresses to a row address decoder 522 and a column address decoder 528, respectively. The column address decoder 528 may select bit lines extending through the array 502 corresponding to respective column addresses. The row address decoder 522 may be connected to a word line driver 524 that activates respective rows of memory cells in the array 502 corresponding to received row addresses. The selected data line (e.g., a bit line or bit lines) corresponding to a received column address may be coupled to a read/write circuitry 530 to provide read data to an output data buffer 534 via an input-output data path 540. Write data may be provided to the memory array 502 through an input data buffer 544 and the memory array read/write circuitry 530.

The memory 500 may include a voltage regulator 550 coupled to a load current control circuit 552. The voltage regulator circuit 550 may be configured to receive a reference voltage, $V_{ref}$, and to provide a regulated voltage 554 to the load current control circuit 552. The load current control circuit 552 may be configured to provide an output voltage $V_{out}$. As described above, the output voltage $V_{out}$ may be constant regardless of the current load on the load current control circuit 552. That is, the load current control circuit 552 compensates for an increased current load such that the output voltage, $V_{out}$, remains constant. The voltage regulator circuit 550 and the load current control circuit 552 may be used, for example, in a data path (e.g., data path 540) or in a memory bank to provide a constant voltage output signal regardless of the current load.

Those of ordinary skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

What is claimed is:

1. An apparatus comprising:
    a voltage regulator configured to produce a regulated voltage;
    a plurality of current circuits coupled in parallel between an output node and a power node, each of the plurality of current circuits including first and second transistors coupled in series, the first transistor of each of the plurality of current circuits being biased with the regulated voltage; and
    a load detection circuit comprising third and fourth transistors connected in series, the fourth transistor biased with the regulated voltage and configured to create load threshold voltages at a source of the fourth transistor and after respective ones of a plurality of resistors coupled in series to the source of the fourth transistor, the load detection circuit operable to activate the second transistor of selected one or ones of the plurality of current circuits in response to a comparison of respective ones of the threshold voltages with a voltage at the output node.

2. The apparatus of claim 1, wherein the second transistor of a first selected one or ones of the plurality of current circuits is activated responsive to determining that the voltage at the output node has decreased by at least a first amount.

3. The apparatus of claim 2, wherein the load detection circuit is further configured to activate the second transistor of a second selected one or ones of the plurality of current circuits responsive, at least in part, to the voltage at the output node.

4. The apparatus of claim 3, wherein the second transistor of the second selected one or ones of the plurality of current circuits is activated responsive to determining that the voltage at the output node has decreased by at least a second amount.

5. The apparatus of claim 4, wherein the second transistor of the first selected one or ones of the plurality of current circuits is configured to remain activated when the second transistor of the second selected one or ones of the plurality of current circuits is activated.

6. The apparatus of claim 3, wherein the second selected one or ones of the plurality of current circuits is greater in number than the first selected one or ones of the plurality of current circuits.

7. The apparatus of claim 6, wherein the second selected one or ones of the plurality of current circuits includes twice as many current circuits as the first selected one or ones of the plurality of current circuits.

8. The apparatus of claim 1, wherein the load detection circuit configured to provide one or more load detection signals indicative of a current demand through the plurality of resistors wherein the load detection signal to activate the second transistor of the selected one or ones of the plurality of current circuits responsive to the one or more load detection signals.

9. An apparatus comprising:
    a voltage regulator configured to generate a regulated voltage,
    a load detection circuit configured to detect a current load demand and provide a load detection signal indicative of the current load demand, the load detection circuit comprising first and second load transistors connected in series having a plurality of load resistors serially coupled to a source of the second load transistor, the second load transistor biased with the regulated voltage and configured to create a plurality of load threshold voltages at the source of the second load transistor and after respective ones of the plurality of load resistors; and
    a control circuit configured to activate one or more current circuits biased with the regulated voltage based, at least in part, on the load detection signal, wherein the load detection signal corresponds to a comparison of respective ones of the plurality of load threshold voltages with a voltage at an output node of the one or more current circuits.

10. The apparatus of claim 9, wherein the load detection circuit further comprises:
    a plurality of comparators configured to provide the load detection signal based, at least in part, on whether the voltage at the output node of the one or more current circuits is less than the plurality of load threshold voltages.

11. The apparatus of claim 10, wherein the control circuit is configured to deactivate the one or more current circuits responsive to the load detection circuit determining that the voltage at the output node is not less than the plurality of load threshold voltages.

12. The apparatus of claim 10, wherein the plurality of load threshold voltages are associated with an increase in a current demand of the load.

13. The apparatus of claim 10, wherein the control circuit is configured to activate additional current circuits based on a number load threshold voltages exceeded by the voltage at the output node.

14. The apparatus of claim 9, wherein each of the one or more current circuits comprises:
   a first transistor and a second transistor coupled in series between a power node and the output node,
   wherein the control circuit is configured to activate the second transistor based, at least in part on the load detection signal.

15. An apparatus comprising:
   a voltage regulator configured to generate a regulated voltage;
   a plurality of current circuits to provide current to a load, each of the plurality of current circuits coupled to an output node and biased with the regulated voltage;
   a load detection circuit comprising first and second load transistors connected in series having a plurality of load resistors serially coupled to a source of the second load transistor, the second load transistor biased with the regulated voltage and configured to create a plurality of load threshold voltages at the source of the second load transistor and after respective ones of the plurality of load resistors; and
   a control circuit configured to selectively activate one or more of the plurality of current circuits based, at least in part, on a comparison of respective ones of the plurality of load threshold voltages with a voltage at the output node of the one or more current circuits.

16. The apparatus of claim 15, wherein each current circuit of the plurality of current circuits comprises a transistor configured to receive an enable signal to activate the current circuit, and the control circuit is configured to provide the enable signal.

17. The apparatus of claim 16, wherein the load detection circuit is configured to detect a decrease in the voltage at the output node and to provide a load detection signal indicative of the decrease.

18. The apparatus of claim 17, wherein the load detection circuit is configured to determine whether the voltage at the output node is less than one or more of the plurality of load threshold voltages.

19. The apparatus of claim 16, wherein
   the control circuit is configured to provide a first enable signal to selectively activate a first set of the plurality of current circuits; and
   the control circuit is further configured to provide a second enable signal to selectively activate a second set of the plurality of current circuits.

20. The apparatus of claim 19, wherein the control circuit is further configured to provide the first enable signal responsive to the load detection circuit determining that the voltage at the output node is less than a first load threshold voltage and provide the second enable signal responsive to the load detection circuit determining that the voltage at the output node is less than a second load threshold voltage.

* * * * *